United States Patent Office 3,483,269
Patented Dec. 9, 1969

---

3,483,269
OLEFIN OLIGOMERIZATION
Eugene F. Magoon and Lawrence G. Cannell, Berkeley, and John H. Raley, Walnut Creek, Calif., assignors to Shell Oil Company, New York, N.Y., a corporation of Delaware
No Drawing. Filed Sept. 27, 1967, Ser. No. 671,139
Int. Cl. C07c 3/18; B01j 11/78
U.S. Cl. 260—683.15     8 Claims

ABSTRACT OF THE DISCLOSURE

Olefins are oligomerized to a mixture of principally olefin dimers and trimers in the presence of a heterogeneous catalyst composition comprising a π-allyl nickel halide supported on an acidic, inorganic oxide catalyst support. Pretreatment of the catalyst support by calcining and treating with an alykyl aluminum compound increases the activity of the catalyst.

BACKGROUND OF THE INVENTION

It is well known that many transition metal compounds and complexes are useful in the conversion of low-molecular-weight olefins to olefinic products of higher molecular weight, e.g., dimers and trimers as well as higher oligomers. The Belgian Patent No. 640,535 issued Nov. 28, 1963, to Shell Internationale Research Maatschappij, N. V., describes a process wherein a homogeneous oligomerization catalyst prepared from hydrocarbon-soluble nickel salts and an alkyl aluminum halide is employed to dimerize olefins. Although utilization of such homogeneous catalysts affords oligomer mixtures of a desirable composition, the catalysts are relatively unstable upon attempted storage and must be prepared in situ immediately prior to use.

SUMMARY OF THE INVENTION

It has now been found that an improved process of oligomerizing lower olefins is afforded by employing a heterogeneous catalyst composition comprising a π-allyl nickel halide supported upon an acidic inorganic oxide support, which support has optionally been pretreated with an alkyl aluminum compound. The heterogeneous catalyst compositions are characterized by greater stability during production, storage and utilization, while retaining a high level of catalyst activity.

DESCRIPTION OF PREFERRED EMBODIMENTS

The olefin reactant

The olefin oligomerization process is broadly applicable to the oligomerization of monoolefins of 2 or more carbon atoms having terminal or internal ethylenic unsaturation. Preferred olefins are straight-chain hydrocarbon monoolefins of from 2 to 10 carbon atoms as illustrated by ethylene, propylene, 1-butene, 2-butene, 1-pentene, 1-hexene, 2-hexene, 1-octene and 3-octene. In general, terminal olefins, i.e., α-olefins, are preferred over analogous internal olefins and particularly preferred are the straight-chain or normal α-olefins of from 2 to 5 carbon atoms, i.e., ethylene, propylene, 1-butene and 1-pentene. Also suitably employed are mixtures of two or more of the above olefins, wherein the resulting process is one of co-oligomerization, which term is embraced by the generic term "oligomerization" as employed herein. Such co-oligomerization is inherent, of course, in any process involving production of trimer. In the preferred modifications, however, the oligomerization process employs a feed consisting essentially of a single olefinic reactant.

The catalyst

The oligomerization catalyst composition comprises a π-allyl nickel halide supported on an acidic inorganic oxide catalyst support, which support is optionally pretreated with an alkyl aluminum compound prior to incorporation of the nickel compound.

The nickel-containing catalyst component is a π-allyl nickel halide incorporating a nickel monohalide moiety bonded to a π-allylic moiety characterized by delocalization of the electronic contribution of the π-allyl moiety among three contiguous carbon atoms. By way of illustration, the simplest member of this class is the π-allylnickel halide represented by the formula

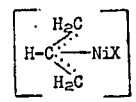

(I)

wherein X is halogen. Although the complex of the above Formula I and other π-allyl nickel halides probably exist independently in the form of a dimer, for convenience and simplicity the π-allyl nickel halides are herein depicted and named as monomeric complexes.

In generic terms, the π-allyl nickel halides useful as a catalyst composition component are represented by the formula

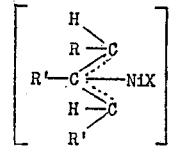

(II)

wherein R and R' independently are hydrogen, alkyl of up to 8 carbon atoms, phenyl or alkaryl of up to 8 carbon atoms, X is halogen, preferably halogen of atomic number from 17 to 35 inclusive, i.e., the middle halogens chlorine or bromine, and the dotted line designation represents the electronic delocalization among the three illustrated contiguous carbon atoms, with the proviso that R together with one R' may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation. Illustrative of suitable π-allyl nickel halides of the above Formula II are π-allylnickel chloride, π-allylnickel bromide, π-crotylnickel chloride, π-methallylnickel chloride, π-ethallylnickel bromide, π-cyclooctenylnickel chloride, π-cyclohexenylnickel, bromide, π-2-phenylallylnickel chloride and π-cyclododecenylnickel chloride. In general, the π-allyl nickel chlorides are preferred over the corresponding π-allyl nickel bromides and particularly preferred as the catalyst component is π-allylnickel chloride, i.e., the compound of the above Formula I wherein X is chlorine.

The catalyst support comprises a normally solid, acidic, inorganic oxide material containing a major proportion of at least one oxide component selected from silica, alumina and boria. Such materials are known as refractory oxides and include synthetic components as well as acid-treated clays and similar materials or crystalline alumino-silicates known in the art as molecular sieves. Synthetic refractory oxides are preferred over naturally occurring materials or molecular sieves and exemplary acidic synthetic refractory oxides include silica, silica-alumina, silica-magnesia, silica-zirconia, boria-alumina, silica-alumina-boria, silica-alumina-zirconia, silica-alumina-magnesia, and silica-titania-zirconia. Preferred refractory oxide supports are siliceous refractory oxides, that is, refractory oxides containing silica as the major component, and particularly preferred as the siliceous refractory oxide is silica-alumina.

The supported catalyst compositions are produced by intimately contacting the π-allyl nickel halide and the acidic oxide support by conventional contacting techniques, as by contacting a solution of the π-allyl nickel compound in a hydrocarbon solvent with the support for a time sufficient to allow interaction between the π-allyl nickel compound and the support. The proportion of π-allyl nickel halide to be incorporated into the catalyst composition is not critical so long as sufficient π-allyl nickel halide is present to allow adequate olefin-catalyst contact during the oligomerization process. Amounts of π-allyl nickel halide from about 3% by weight to about 14% by weight based on total catalyst composition are satisfactory with amounts from about 5% by weight to about 10% by weight on the same basis being preferred.

No special pretreatment of the catalyst support prior to contact with the π-allyl nickel halide is required, but better results are obtained if the support has been calcined at temperatures from about 450° C. to about 600° C. for a period of three to six hours prior to the formation of the catalyst composition. Best results are obtained in the oligomerization process and catalyst compositions of greatest activity are obtained when an additional pretreatment operation is utilized which comprises pretreating the catalyst support with an alkyl aluminum compound. The precise function of the pretreatment operation is not entirely understood but it is considered that treatment with alkyl aluminum compound serves to modify the acidic sites on the catalyst support as by replacing at least a portion of the acidic protons with aluminum moieties. The alkyl aluminum compound employed in the optional but preferred support pretreatment is a trialkylaluminum, an alkylaluminum dihalide or a dialkylaluminum halide. Generically, these alkyl aluminum compounds are represented by the formula $$R''_n AlX_{(3-n)} \qquad (III)$$

wherein R″ is alkyl of up to 8 carbon atoms, preferably of up to 4, X has the previously stated significance, e.g. fluorine, chlorine or bromine, and n is a whole number from 1 to 3 inclusive. Illustrative of such alkyl aluminum compounds are triethylaluminum, tripropylaluminum, triisobutylaluminum, trioctylaluminum, diethylaluminum chloride, propylaluminum dibromide, dihexylaluminum bromide, ethylaluminum dichloride, dibutylaluminum chloride and octylaluminum dichloride. In most applications, the preferred class of alkyl aluminum compounds comprises the alkylaluminum dihalides, particularly the alkylaluminum dichlorides.

The amount of alkyl aluminum compound to be employed in pretreatment of the catalyst support is not critical and as previously stated, no pretreatment is required. In the modifications wherein pretreatment is utilized, however, treatment of the catalyst support with up to about 30% by weight, preferably with up to about 20% by weight, of alkyl aluminum compound based upon the refractory oxide support is satisfactory. Suitable support pretreatment procedures comprise intimately contacting the support with alkyl aluminum compound as by dissolving the aluminum compound in an inert solvent, e.g., inert hydrocarbons such as pentane, hexane or benzene, and washing the support with the resulting solution. As previously stated, it is considered likely that some aluminum species are incorporated into the support, as through replacement of acidic protons. However, this appears to be the principal role of the alkyl aluminum compound and no special precautions with regard to oxygen contact are required subsequent to any pretreatment since the advantages gained by pretreatment are not lost by exposure of the treated support to oxygen during storage or handling prior to introduction of the π-allyl nickel halide.

The reaction conditions

The oligomerization process is conducted in a fluid phase, i.e., in either the gaseous or liquid phase, in the presence or in the absence of an inert reaction diluent. When conducted in the vapor phase, inert gaseous diluents such as nitrogen, argon, helium or volatile saturated hydrocarbons, e.g., methane or ethane, are satisfactory. Illustrative liquid-phase reaction diluents include hydrocarbons and halohydrocarbons free from aliphatic carbon-carbon unsaturation such as hexane, octane, decane, cyclohexane, decahydronaphthalene, benzene, toluene, chlorobenzene, methylene chloride and methylene bromide. In many modifications of the process, a portion of the olefin oligomer product suitably serves as reaction diluent and no added reaction diluent is employed. When diluent is utilized, however, amounts up to about four moles of diluent per mole of olefin are satisfactory. The process is preferably conducted in an inert reaction environment so that the presence of reactive materials such as water and oxygen is desirably avoided. Suitable reaction conditions are therefore substantially anhydrous and substantially oxygen-free.

The method of conducting the oligomerization process is not critical. In one modification, the olefin reactant, the catalyst composition and any diluent which is employed are charged to an autoclave or similar reactor and maintained at reaction conditions for the desired reaction period. In another modification, oligomerization is effected in a continuous manner as by passing the olefin feed, either in the vapor phase or in liquid-phase solution, through a reaction in which the heterogeneous catalyst composition is maintained. By any modification, the oligomerization process is conducted at moderate temperatures and pressures. Suitable reaction temperatures vary from about 0° C. to about 130° C. depending in part upon the particular olefin to be oligomerized. The temperature range from about 30° C. to about 80° C. is preferred. The process is conducted at or above atmospheric pressure, and pressures from about 1 atmosphere to about 100 atmospheres are satisfactory. Best results are obtained when a pressure of from about 5 atmospheres to about 40 atmospheres is employed.

At the conclusion of the reaction, the product mixture is separated and the olefin oligomer product is recovered by conventional means such as fractional distillation, selective extraction, adsorption and the like. Unreacted olefin is suitably recycled for additional conversion.

The products of the oligomerization process are dimers and trimers of the olefin reactant with amounts of tetramer and heavier product being observed on certain occasions, particularly when ethylene is used as the olefin reactant. In general, selectivity to dimer and trimer increases with the molecular weight of the olefin so that utilization of olefin of 4 or more carbon atoms results in the substantially exclusive production of a dimer and trimer mixture. The product mixture is characterized by a relatively high proportion of branched or iso oligomer product, although some linear, unbranched or normal oligomer is also observed. By way of illustration, oligomerization of propylene leads to a mixture of principally dimer ($C_6$) and trimer ($C_9$) product. The major dimer product is methylpentene although n-hexene and dimethylbutene are also observed. Co-oligomerization of propylene and butene results in the production of dimeric hexenes and octenes, trimeric nonenes and dodecenes and co-oligomeric products such as heptenes, decenes and undecenes.

The olefin products are materials of established utility and many are chemicals of commerce. The olefins are polymerized to thermoplastic polyolefins as by titanium chloride-aluminum alkyl catalyst systems and are converted by conventional "Oxo" processes to aldehydes of one more carbon atom which are hydrogenated to corresponding alcohols. Alternatively, the olefins are converted to secondary and tertiary alcohols as by sulfuric acid-catalyzed hydration. The $C_{12}$–$C_{20}$ alcohols thus produced are ethoxylated with ethylene oxide in the presence of a basic catalyst, e.g., sodium hydroxide, to form conventional detergents and the lower molecular weight alcohols are esterified with polyhydric acids, e.g., phthalic acid, to form plasticizers for polyvinyl chloride.

To further illustrate the improved process of the invention, the following examples are provided. It should be understood that the details thereof are not to be regarded as limitations, as they may be varied as will be understood by one skilled in the art.

EXAMPLE I

A catalyst support was prepared by heating 1.9 g. of a commercial silica-alumina in air at 550° C. for four hours and subsequently sweeping with nitrogen and washing with pentane, a pentane solution of triethylaluminum and additional pentane. The support was then contacted with a pentane solution of π-ally nickel chloride until approximately 0.12 g. of nickel was present on the resulting solid. The catalyst composition was placed in an autoclave equipped with a stirring device and a dip tube that allowed all but approximately 20 ml. of the contents to be forced out without opening the autoclave. To the autoclave was charged 20 ml. of chlorobenzene as solvent and 50 ml. of propylene. The temperature rose to approximately 50° C. and the pressure decreased rapidly from a maximum of 150 p.s.i.g. After a short reaction time, stirring was stopped and the solid was allowed to settle, whereupon the supernatent liquid was pressurized out of the system. This cycle was repeated twelve times to afford the overall results provided in Table I.

TABLE I

| | |
|---|---|
| Temperature ° C. | 0–67 |
| Reaction time hr. | 0.5 |
| Pressure p.s.i.g. | 10–150 |
| Propylene fed moles | 7.75 |
| Propylene conversion percent | 96 |
| Selectivity, percent: | |
| Hexenes | 81 |
| Nonenes | 17 |
| Dodecenes | 2 |
| Hexene composition, percent: | |
| n-Hexenes | 26.6 |
| Branched hexenes | 73.4 |

The selectivity to product type, e.g., dimer or trimer, was determined by gas-liquid chromatographic analysis of the product mixture. A portion of the product mixture was hydrogenated to yield a saturated alkane product from which the isomeric distribution of the initial hexene composition was determined by gas-liquid chromatographic analysis of the hydrogenated material.

EXAMPLE II

By the procedure of Example I, catalyst compositions were prepared containing approximately 1.8 millimoles of nickel on 2 g. of the pretreated support. In a series of runs, each catalyst was charged to a flow reactor wherein it was continuously contacted with propylene and/or 2-butene at a pressure of 350 p.s.i.g. The addition of olefin feed was measured in terms of the Weight Hourly Space Velocity (WHSV) which relates the weight of feed to the weight of catalyst as a function of time and has the units of reciprocal hours. The results of this series are provided in Table II.

TABLE II

| Run | 1 | 2 | 3 | 4 |
|---|---|---|---|---|
| Temperature, ° C. | 50 | 26 | 100 | 75 |
| Time, hr. | 1.3 | 2.2 | 3.0 | 0.5 |
| Feed, moles: | | | | |
| Propylene | 6.9 | | | 1.3 |
| 2-butene | | 2.9 | 3.2 | 0.6 |
| WHSV | 125 | 27 | 22 | 88 |
| Conversion, percent: | | | | |
| Proplyene | 80 | | | 100 |
| Butylene | | 22 | 27 | 44 |
| Product, percent wt.: | | | | |
| Isohexenes | 58 | | | 48.8 |
| n-Hexenes | 22 | | | 17.1 |
| Isoheptenes | | | | 14.6 |
| n-Heptenes | | | | 2.4 |
| Isooctenes | | 86.6 | 83.8 | 4.5 |
| n-Octenes | | 8.6 | 8.6 | 0.5 |
| $C_9H_{18}$ | 18 | | | 8.4 |
| $C_{10}H_{20}$ | | | | 2.4 |
| $C_{11}H_{22}$ | | | | 1.4 |
| $C_{12}H_{24}$ | 2 | 4.8 | 7.6 | |

EXAMPLE III

Catalysts containing approximately 1.6 millimoles of nickel on 2 g. of support were prepared by contacting π-allylnickel chloride and a silica-alumina catalyst support prepared by the procedure of Example I, except that ethylaluminum dichloride was employed to pretreat the support rather than triethylaluminum. The catalysts were utilized to oligomerize propylene, 2-butene and 2-pentene in a series of runs according to the procedures of Example II. The results of this series are shown in Table III.

TABLE III

| Run | 1 | 2 | 3 |
|---|---|---|---|
| Temperature, ° C. | 25 | 45–66 | 46–66 |
| Pressure, p.s.i.g. | 350 | 350 | 350 |
| Time, hrs. | 0.66 | 1.0 | 0.75 |
| Feed, moles: | | | |
| Propylene | 1.7 | | |
| 2-butene | | .2 | |
| 2-pentene | | | 0.84 |
| WHSV | 52 | 57 | 37 |
| Conversion, percent: | | | |
| Propylene | 100 | | |
| 2-butene | | 92 | |
| 2-pentene | | | 61 |
| Product, percent wt.: | | | |
| Isohexenes | 49.2 | | |
| n-Hexenes | 19.0 | | |
| Isooctenes | | 76.3 | |
| n-Octenes | | 6.8 | |
| $C_9H_{18}$ | 19.9 | | |
| $C_{10}H_{20}$ | | | 75.7 |
| $C_{11}H_{22}$ | | | |
| $C_{12}H_{24}$ | 11.9 | 16.9 | |
| $C_{15}H_{30}$ | | | 24.3 |

EXAMPLE IV

A number of catalysts were prepared by contacting π-allylnickel chloride with various support materials which, in some instances, had been pretreated with an alkyl aluminum compound. The character of the supports, the alkyl aluminum compounds and the results obtained when the catalysts were employed to oligomerize lower olefins in a batch-type process similar to that of Example I are provided by the data of Table IV.

TABLE IV

| Run | 1 | 2 | 3 | 4 |
|---|---|---|---|---|
| Temperature, °C | 65 | 20–60 | 50 | 50 |
| Alkylaluminum compound | None | $(C_2H_5)_3Al$ | $(C_2H_5)_3Al$ | $(C_2H_5)_2AlF$ |
| Support | $SiO_2/Al_2O_3$ | $SiO_2$ | $SiO_2/MgO$ | $SiO_2/Al_2O_3$ |
| Olefin Feed | $C_3H_6$ | $C_3H_6$ | $C_2H$ | $1-C_4H_8$ |
| Rate of conversion, kg. olefin/hr./g. Ni | 0.5 | 6.2 | Slow | Slow |
| Selectivity, Percent: | | | | |
| Dimer | 84 | 92 | 90 | 91 |
| Trimer | 10 | 7 | 10 | 9 |
| Tetramer | 6 | 1 | | |
| Hexene composition, Percent: | | | | |
| Normal | 25 | 28 | 76 | |
| Branched | 75 | 72 | 24 | |
| Octene composition, Percent: | | | | |
| Normal | | | | 23 |
| Branched | | | | 77 |

EXAMPLE V

A catalyst was prepared by treating 4.53 g. of silica-alumina (previously calcined at 550° C.) with 28.5 millimoles of ethylaluminum dichloride in hexane followed by 2.54 millimole of π-phenylallylnickel bromide in benzene. A 2.0 g. portion of the resulting solid containing 2.2 millimoles of nickel was employed to oligomerize ethylene over a 2.5 hour period in a flow-type process through a stirred autoclave. The reaction temperature was 25–30° C., the reaction pressure was 100 p.s.i.g. and the WHSV was 34. A 99% conversion of the ethylene was obtained to a product whose distribution is provided in Table V.

TABLE V

Selectivity to product, percent weight

| | |
|---|---|
| $C_4H_8$ | 16.7 |
| $n-C_6H_{12}$ | 11.2 |
| $iso-C_6H_{12}$ | 21.4 |
| $n-C_8H_{16}$ | 6.0 |
| $iso-C_8H_{16}$ | 25.8 |
| $C_{10}H_{20}$ | 11.5 |
| $C_{12}H_{24}$ | 6.1 |

We claim as our invention:

1. The process of oligomerizing olefins by intimately contacting hydrocarbon monoolefin of from 2 to 10 carbon atoms and a heterogeneous supported catalyst composition comprising (1) a π-allyl nickel halide wherein the π-allylic moiety is hydrocarbon of 3 to 12 carbon atoms and is otherwise free from aliphatic unsaturation and (2) solid, acidic refractory oxide support, said support having been pretreated with up to 30% by weight based on support of an alkyl aluminum compound of the formula

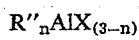

$$R''_nAlX_{(3-n)}$$

wherein R″ is alkyl of up to 8 carbon atoms, X is fluorine, chlorine, or bromine and n is whole number from 1 to 3 inclusive, in a fluid phase at a temperature from about 0° C. to about 130° C. and a pressure of from about 1 atmosphere to 100 atmospheres.

2. The process of claim 1 wherein the π-allyl nickel halide is represented by the monomeric formula

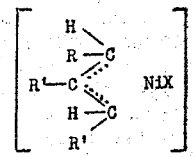

wherein R and R′ independently are hydrogen, alkyl of up to 8 carbon atoms, phenyl and alkaryl of up to 8 carbon atoms and X is chlorine or bromine, and the amount of said π-allyl nickel halide is from about 3% by weight to about 14% by weight based on total catalyst composition.

3. The process of claim 2 wherein the π-allyl nickel halide is a π-allyl nickel chloride and said support is a siliceous refractory oxide.

4. The process of claim 3 wherein the olefin is propylene.

5. The process of claim 3 wherein the olefin is butene.

6. The process of claim 3 wherein the π-allyl nickel chloride is π-allylnickel chloride and said support is silica-alumina.

7. The process of claim 6 wherein the alkyl aluminum compound is triethylaluminum.

8. The process of claim 6 wherein the alkyl aluminum compound is ethylaluminum dichloride.

References Cited

UNITED STATES PATENTS 3,134,824  5/1964  Walker et al. _____ 260—683.15
3,379,706  4/1968  Wilke _____ 260—683.15

PAUL M. COUGHLAN, JR., Primary Examiner

U.S. Cl. X.R.

252—430